United States Patent [19]

Brownlie et al.

[11] E Re. 30,122

[45] Reissued Oct. 23, 1979

[54] MARINE DRIVE

[75] Inventors: Alan Brownlie, Skaneateles; Lewis J. Daly, Fayetteville, both of N.Y.

[73] Assignee: Internal Marine Combustion, Inc., Oswego, N.Y.

[21] Appl. No.: 899,878

[22] Filed: Apr. 24, 1978

Related U.S. Patent Documents

Reissue of:

[64] Patent No.: 3,952,687
Issued: Apr. 27, 1976
Appl. No.: 574,620
Filed: May 5, 1975

U.S. Applications:

[63] Continuation of Ser. No. 416,228, Nov. 15, 1973, abandoned.

[51] Int. Cl.[2] ..... B63H 5/12

[52] U.S. Cl. ..... 115/41 R; 115/34 R; 115/35

[58] Field of Search ..... 115/34 R, 41, 35, 17, 115/18 R; 74/56, 473 R

[56] References Cited

U.S. PATENT DOCUMENTS

| | | | |
|---|---|---|---|
| 2,536,894 | 1/1951 | Wanzer | 115/35 |
| 3,376,842 | 4/1968 | Wynne | 115/41 R X |
| 3,382,839 | 5/1968 | Kiekhaefer | 115/41 R |
| 3,529,564 | 9/1970 | Osswald et al. | 115/34 R |

FOREIGN PATENT DOCUMENTS

| | | | |
|---|---|---|---|
| 705659 | 3/1965 | Canada | 115/41 R |

*Primary Examiner*—Trygve M. Blix
*Assistant Examiner*—Sherman D. Basinger
*Attorney, Agent, or Firm*—Woodcock, Washburn, Kurtz & Mackiewicz

[57] ABSTRACT

An outboard drive for a marine engine includes an upper unit mounted through the transom of the boat and a lower steerable leg which includes the propeller shaft. A pivot point in the upper unit is inside the boat. The drive unit is rotatable about this pivot point to lift, or tilt, the drive from its normal position. The steering tube, shift tube, and lift motor shaft are all rotatable about the pivot point inside the boat. Because of this, the required space between the drive and the engine is minimized.

14 Claims, 30 Drawing Figures

Fig. 1
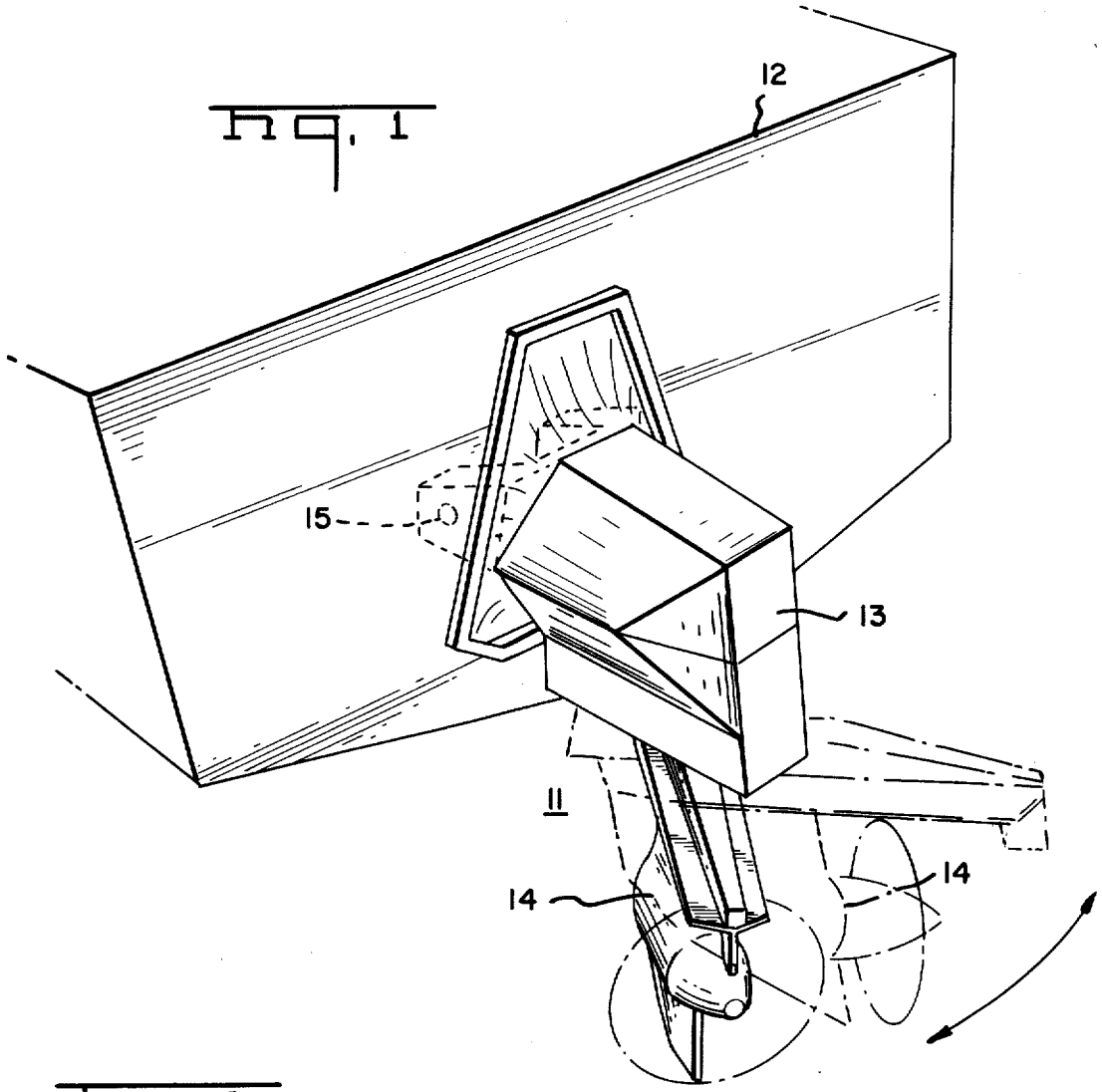
Fig. 1B
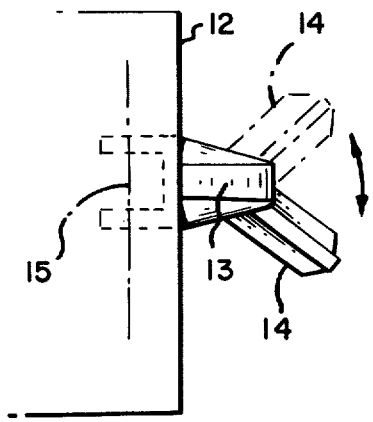
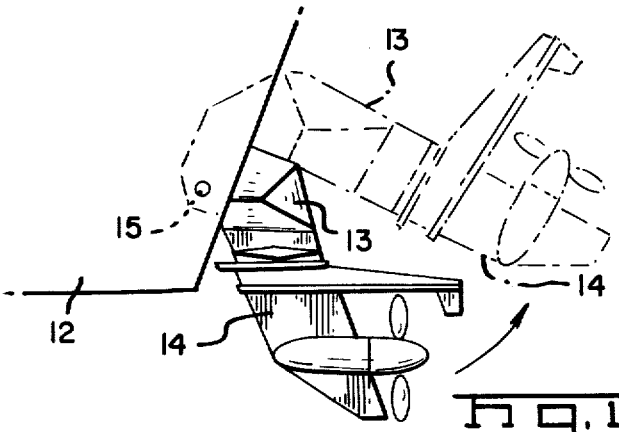
Fig. 1A

A
B
C
D
E
F
G
J
H
I 12
94

96
38
36
34
24
26
30
40
32

96
38
36
34
28
24
44
42
28
30
40
54
56
32

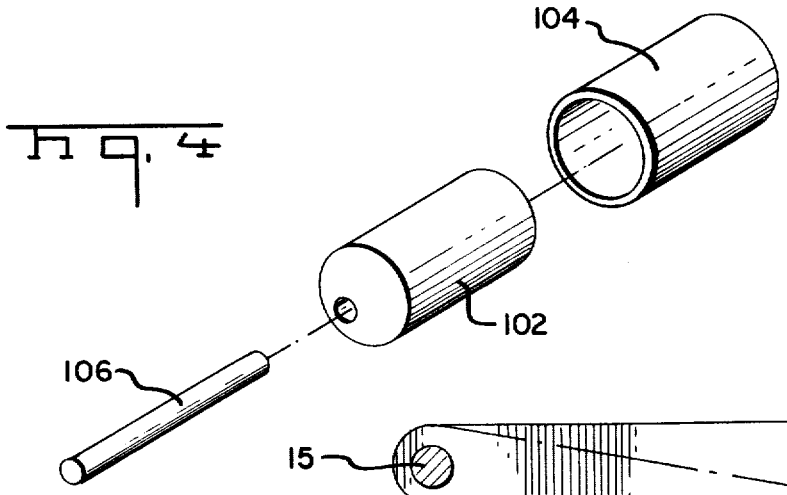
Fig. 4
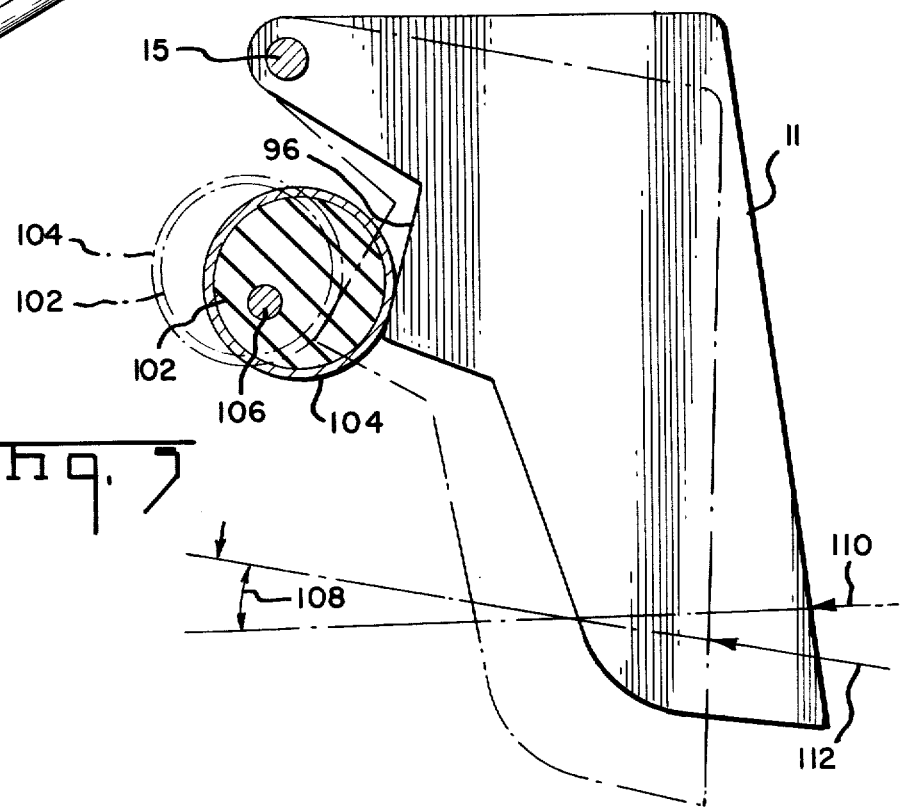
Fig. 7
Fig. 6A
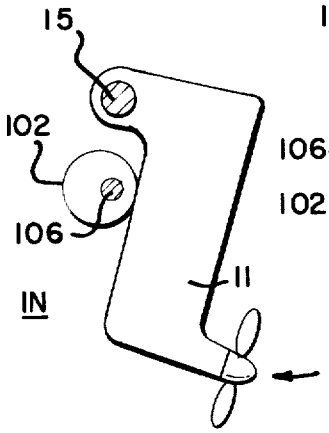
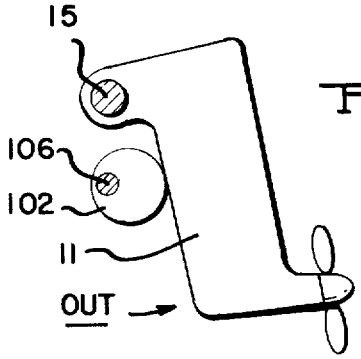
Fig. 6B

MARINE DRIVE

Matter enclosed in heavy brackets [ ] appears in the original patent but forms no part of this reissue specification; matter printed in italics indicates the additions made by reissue.

This application is a continuation of application Ser. No. 416,228, filed Nov. 15, 1973 and now abandoned.

BACKGROUND OF THE INVENTION

This invention relates to marine drives and more particularly to an outboard drive for a marine engine which is inside the boat.

So called inboard-outboard drives have been in use for some time. An example is shown in U.S. Pat. No. 1,798,596 Fahrney which shows a "through-the-transom" drive. These drives propel boats having large engines, typical of inboard engines. The drives also have many of the advantages of outboard motors. For example, the drives can be rotatably lifted so that the propeller shaft can be lifted when the boat is in shallow water. Or, the entire unit can be lifted for inspection and maintenance of the propeller and its shaft.

In addition to tilting upward, the outboard drives are rotatable about a generally vertical axis to steer the boat. One common arrangement provides a universal joint about which the drive can be both tilted and steered. Such an arrangement is shown in U.S. Pat. No. 3,088,296.

In order to conserve space on the boat, it is desirable to have the engine mounted as near to the transom as possible. This has not been possible with prior art drives because they required space between the transom and the engine for steering and gear shift linkages to rotate as the motor is tilted about its pivot point. See for example, U.S. Pat. No. 2,977,923 wherein the point 24 is the pivot point and it is outside of the boat. A relatively large space between the transom and the engine must be provided to accommodate shift and steering linkages which must rotate as the drive is pivoted about this point.

U.S. Pat. No. 3,382,838 Bergstedt shows a marine drive in which the pivot point is inside the boat. However, with this type of drive it is not possible to put the transmission at the point where the drive shaft joins the generally vertical shaft of the drive. As will be apparent subsequently, this is desirable because the transmission can be inserted at this point with the addition of a minimum number of gears. Also, it is desirable to accommodate the steering linkage within the drive casing whereas in the Bergstedt patent the steering linkage is external to the drive and a separate hole through the transom must be provided to accommodate it.

SUMMARY OF THE INVENTION

In accordance with this invention an outboard drive is pivoted about a point inside the boat. We have made the unexpected observation that by moving the pivot point inside the boat we have been able to reduce the required space between the transom and the engine. In accordance with this invention the steering linkage and the shift tube are both rotatable about this common pivot point. Because of this arrangement, these linkages do not travel through an arc which requires space between the transom and the engine. In this manner we have obtained a marked improvement in the space requirements of the combined engine and drive.

Further in accordance with this invention the functions of tilting and steering have been separated. The boat is steered by a lower steerable leg in the drive whereas the tilting is performed about a pivot point inside the boat.

Further in accordance with this invention, new steering and shift mechanisms do not change the steering and shift settings when the drive is tilted.

Further in accordance with this invention a novel reverse lock-out is provided. The lock-out allows the drive to assume a new angle of attack when the drive is in reverse so that the propeller exerts a lifting action on the stern of the boat.

Further in accordance with this invention the boat is trimmed by an eccentric member constructed of resilient material with a thin impact resistant coating. This member deflects under load. It absorbs shock when the drive is suddenly released from its upright position and falls back to its normal position. The member also deflects under load when the boat is suddenly accelerated. This changes the attack of the propeller slightly to aid in planing the boat.

Further in accordance with the invention the watertight seals which prevent water from entering the opening in the transom are separated from the shock absorbing mounting. Since the mounting absorbs all vibration, the likelihood of the seal being damaged to admit water is lessened.

Further in accordance with this invention a streamlined cowl fits over the propeller shaft and is secured to the lower leg by a snap ring and bolt which enter the cowl at points which are covered by the propeller hub. In this way, the cowl presents a smooth streamlined water-flow passing the propeller.

The foregoing and other objects, features and advantages of the invention will be better understood from the following more detailed description and appended claims.

DESCRIPTION OF THE DRAWINGS

FIG. 1 is a perspective view of the drive mounted on the stern of the boat;

FIG. 1A is a side view depicting the tilting;

FIG. 1B is a top view depicting the steering action;

FIG. 3 depicts the spiral bevel gears in the transmission;

FIG. 4 is an exploded view of the eccentric member;

FIG. 5 depicts the operation of the eccentric member in absorbing thrust during acceleration;

FIGS. 6A and 6B depict the operation of the eccentric member in trimming boat;

DESCRIPTION OF THE PREFERRED EMBODIMENT

Figures 1C, 7:
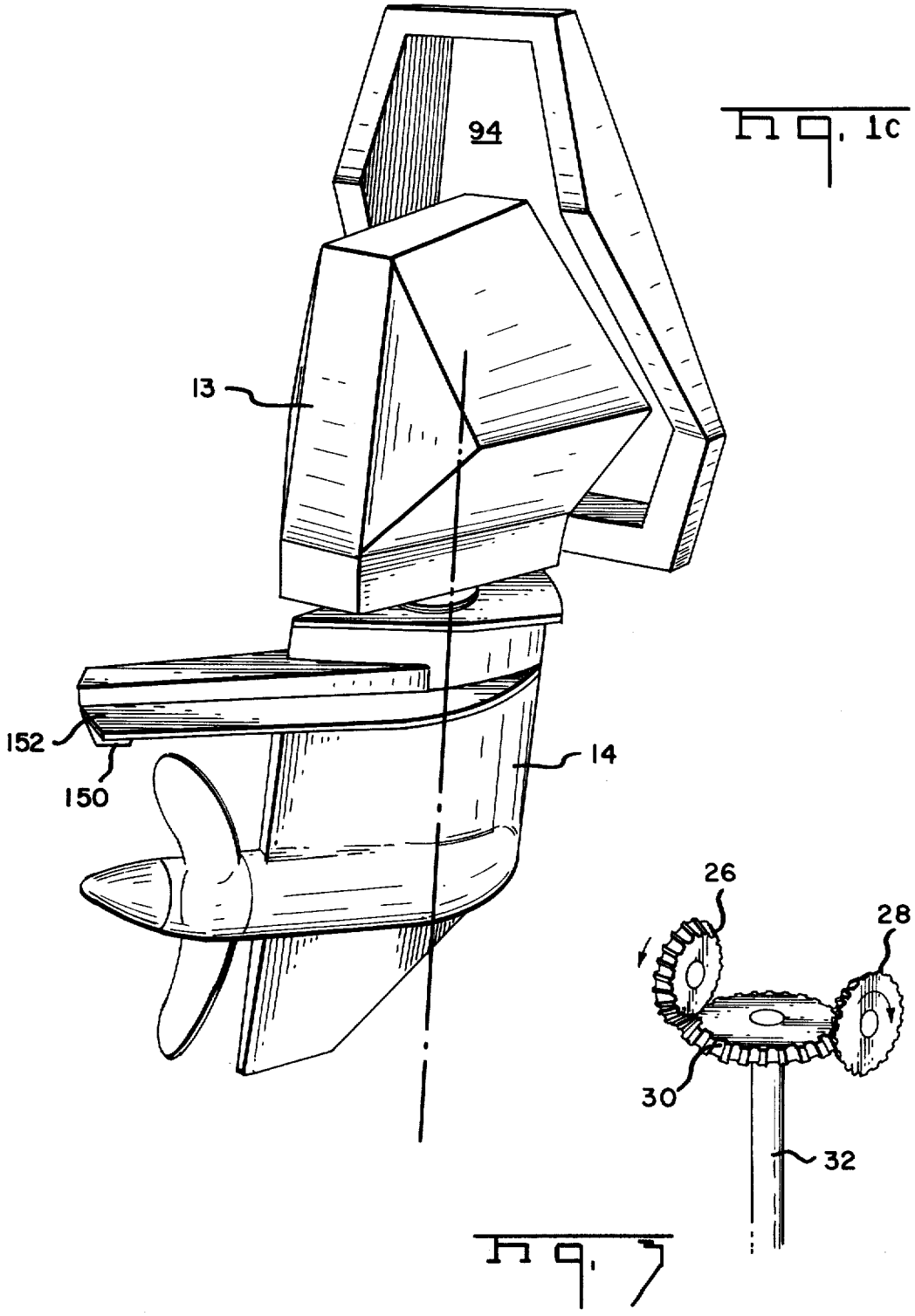
FIG. 1C is a perspective view showing the lower leg in a steer left position.
FIG. 7 is an exploded view of the steering linkage.

Referring to FIGS. 1 and 1A-1C, the drive 11 is shown secured to the transom 12 of a boat. The drive includes the upper unit 13 mounted on the boat transom and a lower steerable leg 14. The unit can be lifted by rotating it about the pivot point 15 which is inside the boat. A small spacing between the drive 11 and the engine is possible because there are no gear shifting or steering linkages which need to be rotated in this space when the engine is tilted.

THE DETAILS OF THE DRIVE FROM THE ENGINE TO THE PROPELLER, FIGS. 2A-2J

The drive shaft 18 has a spline 20 which engages the drive shaft of the engine. A universal joint 22 connects the drive shaft 20 to the input shaft 24 of the transmission. The middle of the universal joint 22 is the pivot point 15 about which the motor is tilted.

The transmission includes two spiral bevelled gears 26 and 28 which drive the spiral bevelled gear 30 connected to the vertical shaft 32. The spiral bevelled gears are better shown in FIG. 3.

In the position shown the transmission is in neutral with no connection between the input shaft 24 and the vertical shaft 32. The split ring 34 includes blocker gears. When it is moved to the right, or to the left, the blocker gears effect an engagement between the input shaft 24 and the spiral bevel gears 26 or 28. A shift fork 36 rests in the groove of the split ring 34. A push-pull gear shift lever 38 moves the shift fork 36 to the left or to the right.

A centrifugal oil impeller 40 provides a flow of oil through the oil galley 42 to the sleeve 44 of polytetrafluoroethylene or the like which supplies oil to the oppositely rotating spiral bevel gears of the transmission.

The lower steerable unit 14 is suspended from the upper unit by the steering tube 46. The steering tube 46 is rotatably mounted in the tower casting 48 of the upper unit. The rotatable mounting includes the bearings 50 and 52. The shoulder 54 on the steering tube suspends the tube from the clamp 56. The lower leg casting 58 is fastened by screws 60 and 62 to the ring 64 permanently fastened to the steering tube 46. The lower leg 14 can be rotated by the steering tube 46 to steer the boat.

The vertical shaft 32 is inside the steering tube 46. The vertical shaft 32 drives the spiral bevel gear 66. This meshes with a reducing gear 68 on the propeller shaft 70. The propeller shaft rotates in needle bearings 72 and double tapered roller bearings 74. A shoulder 76 on the propeller shaft 70 captivates the shaft against the race of the needle bearings 72 and a shoulder 78 captivates the shaft against the race of the tapered roller bearings 74. A bearing retaining nut 80 and an oil seal 82 complete the rotating propeller shaft assembly. A sacrificial anode 84 retards corrosion of the propeller shaft assembly.

THE STREAMLINED COWL

A cowl 86 encloses the rear portion of the lower steerable unit. In accordance with an important aspect of this invention a snap ring 88 is part of the assembly which holds the cowl on the lower leg casting.

The snap ring 88 is inserted in a slot in the lower leg casting 58 during assembly. It creates a shoulder against which the inner bearing cartridge 89 bears. The cowl 86 has a shoulder 91 which bears against a corresponding shoulder in the lower leg casting 58. The bolts 90 and 92 are inserted through the member 93 and through the cowl 86 into the threaded holes in inner bearing cartridge 89. Tightening of the bolts draws the inner bearing cartridge 89 toward the cowl 86 thereby securing the assembly firmly within the lower leg casting 58. Since the propeller hub covers the flat area through which the bolts 90 and 92 are inserted, there is no need for a flat unexposed area on the cowl. Some prior art outboard drives have included such a flat portion to accommodate the securing bolts and such a portion disturbs the water flow past the propeller. By causing turbulent water flow past the propeller, these prior art drives lose propeller efficiency.

Another common prior art arrangement has threads in the opening in the lower leg casting. The cowl and bearing assembly are threaded into this opening to secure it to the lower leg casting. We have found the assembly including the snap ring 88 to be superior.

A trim tab 150 is mounted on the cavitation plate 152. The trim tab is adjustable and is used to compensate for engine torque.

THE WATER SEALS AND VIBRATION MOUNTING

Figures 2, 2A:
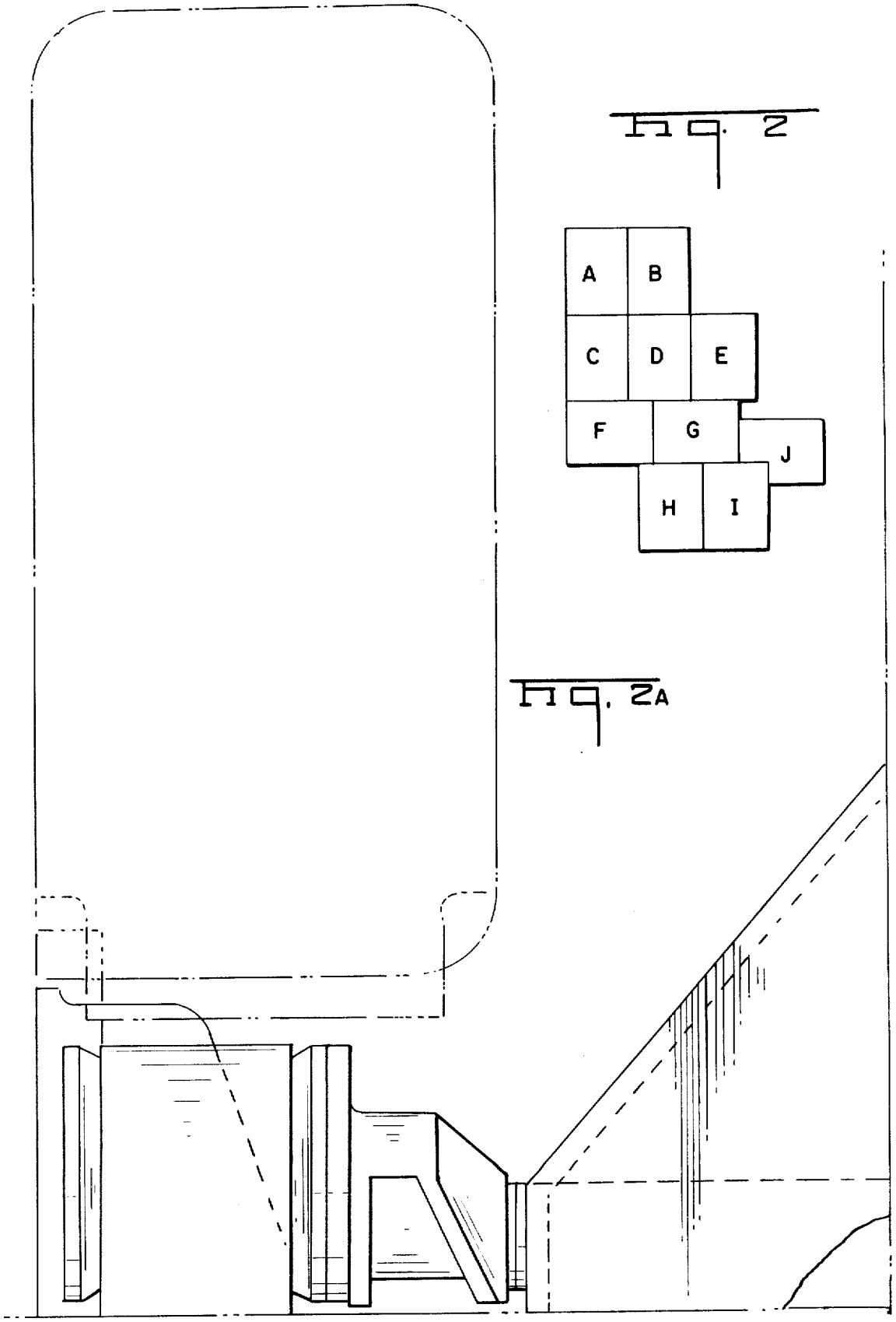
FIG. 2 shows how FIGS. 2A–2J fit together to form an elevational view of a cross-section of the drive.
Figure 28:
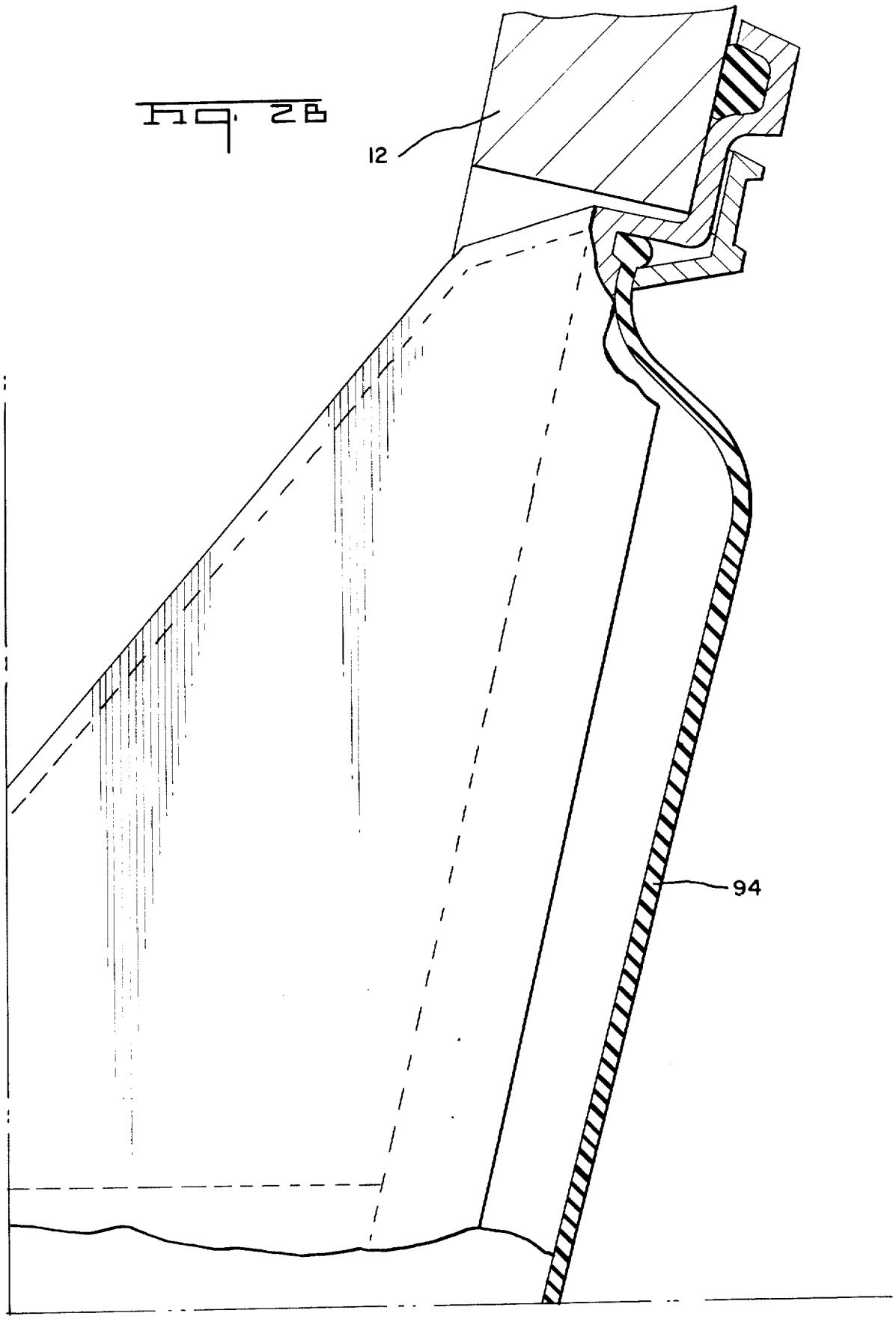
Figure 2C:
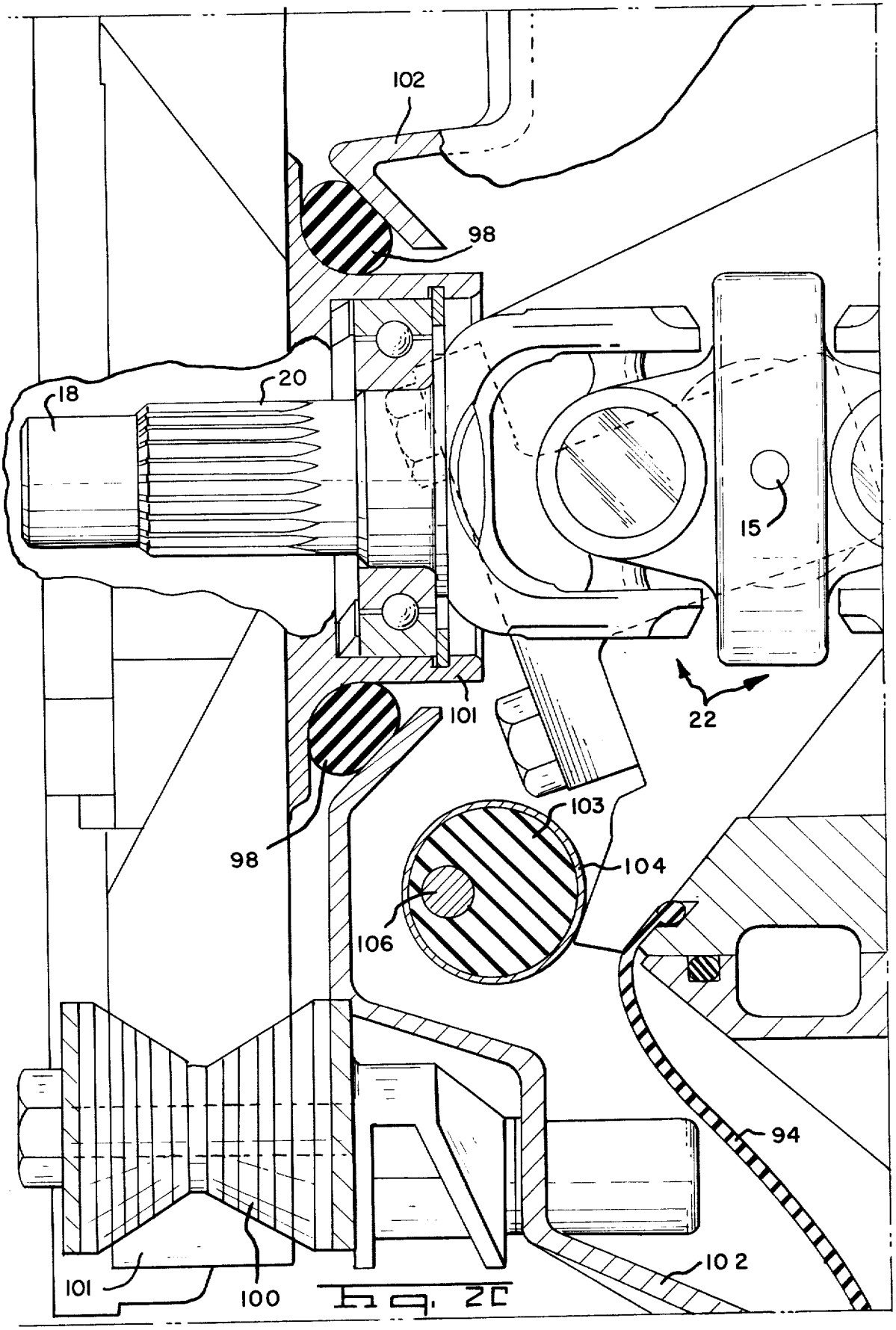
Figure 2D:
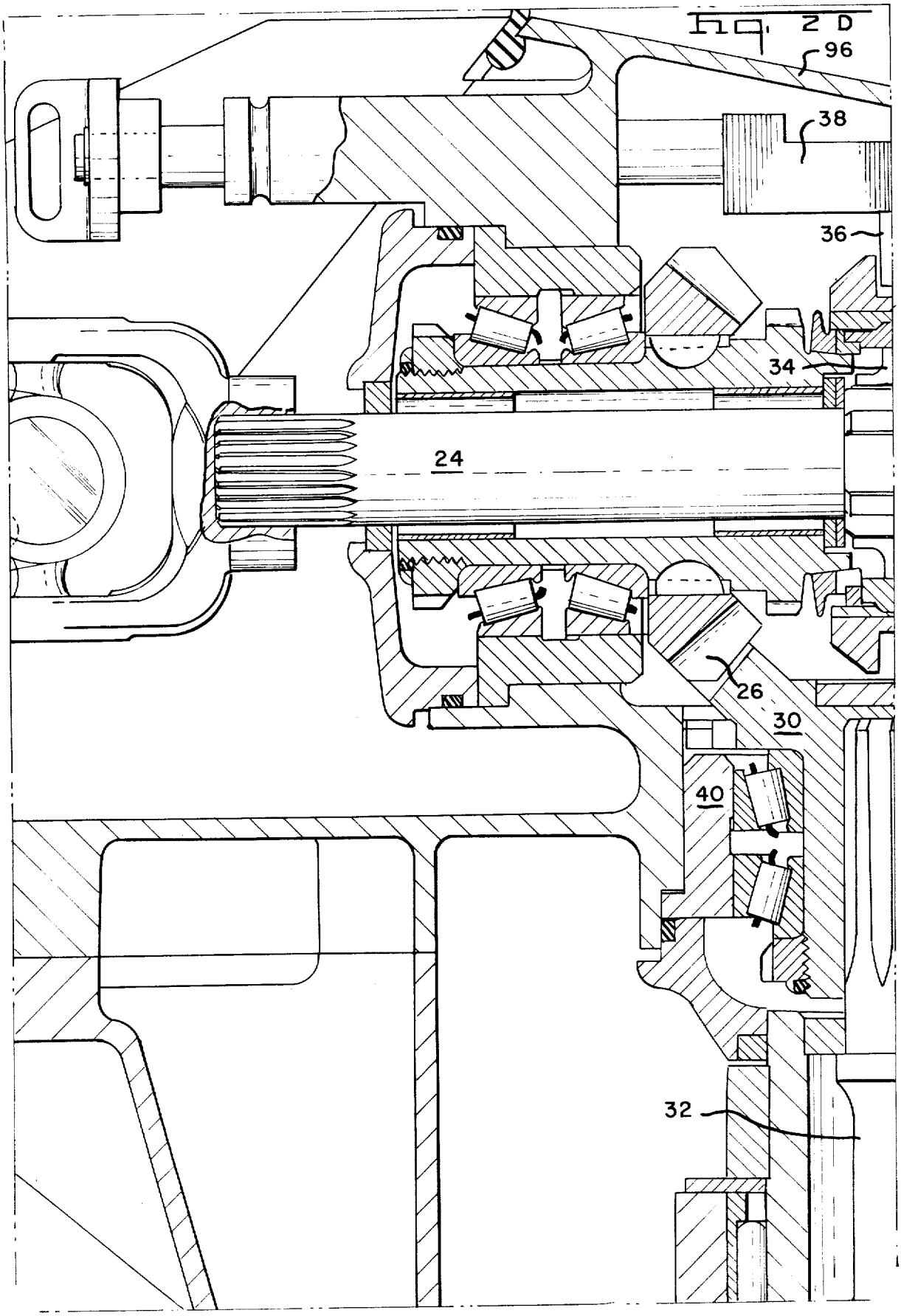
Figure 2E:
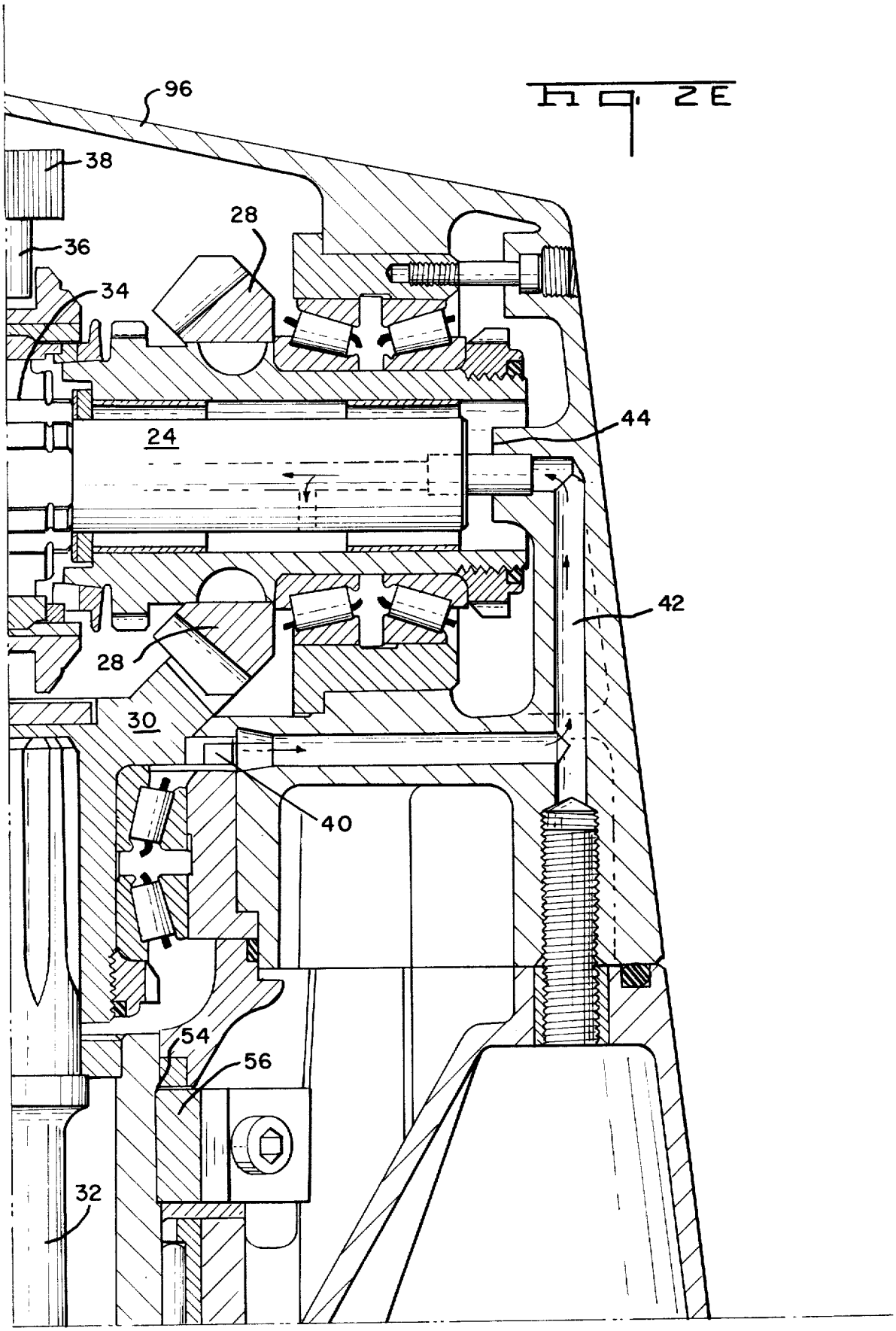
Figure 2F:
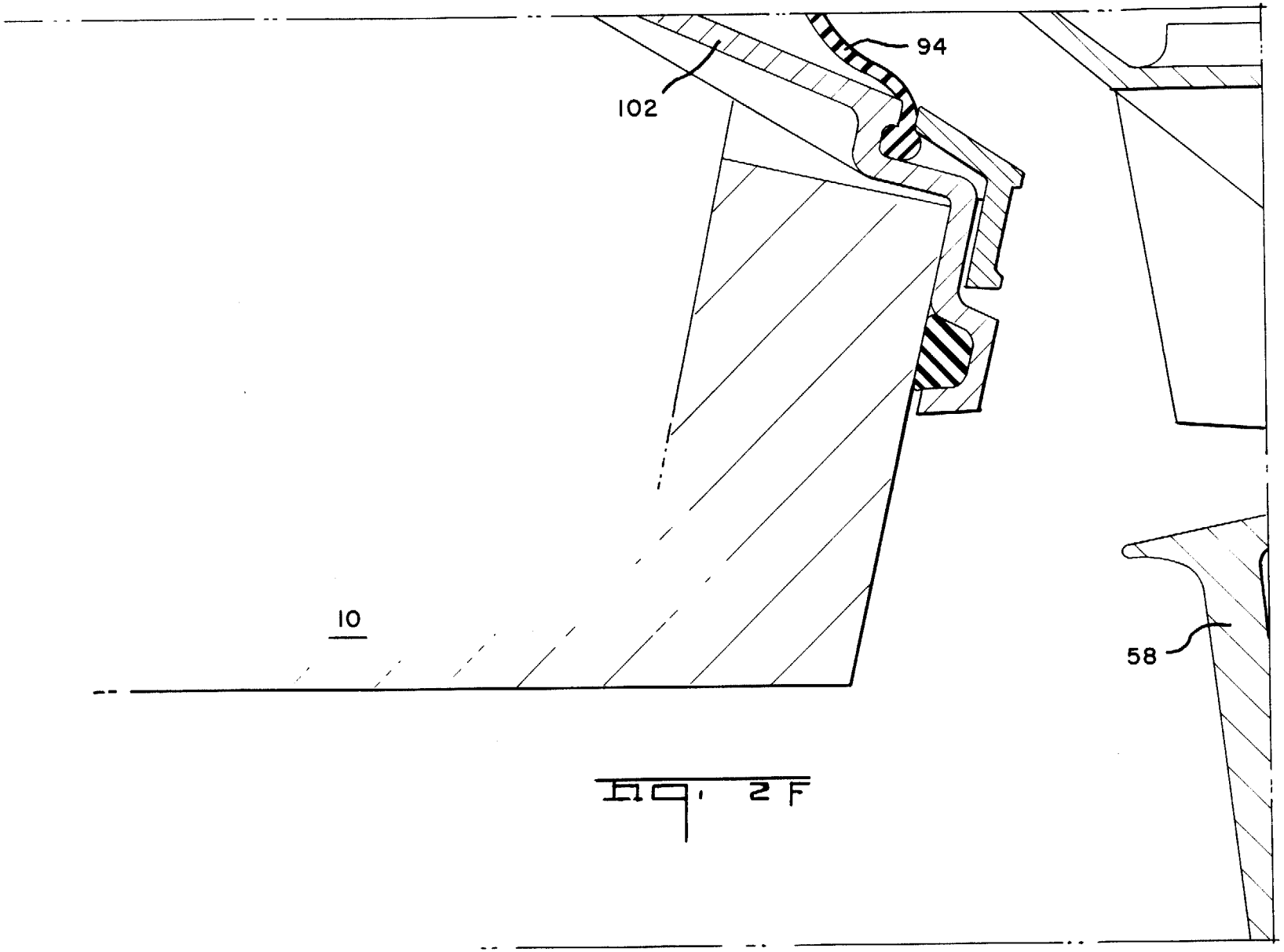
Figure 2G:
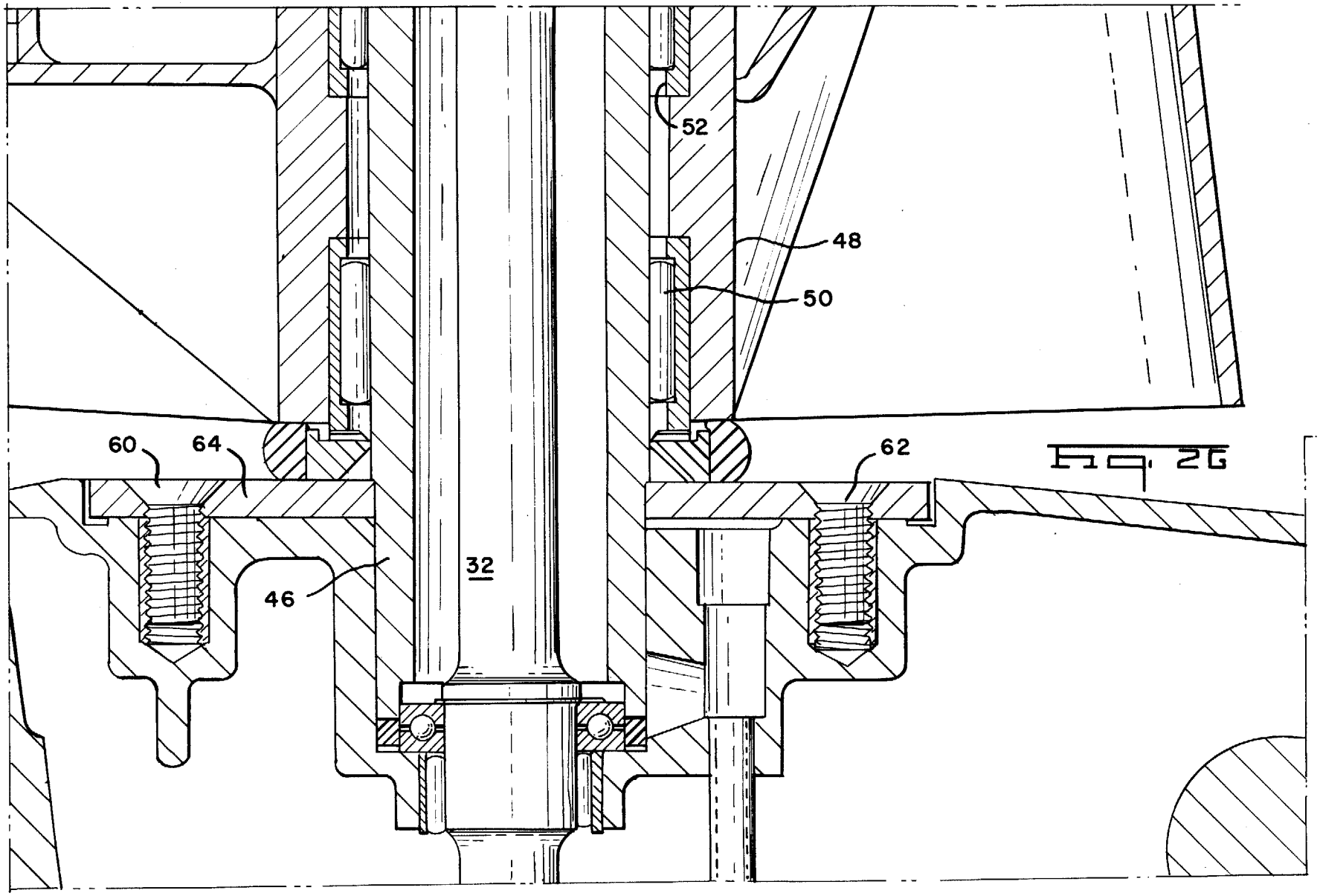
Figure 2H:
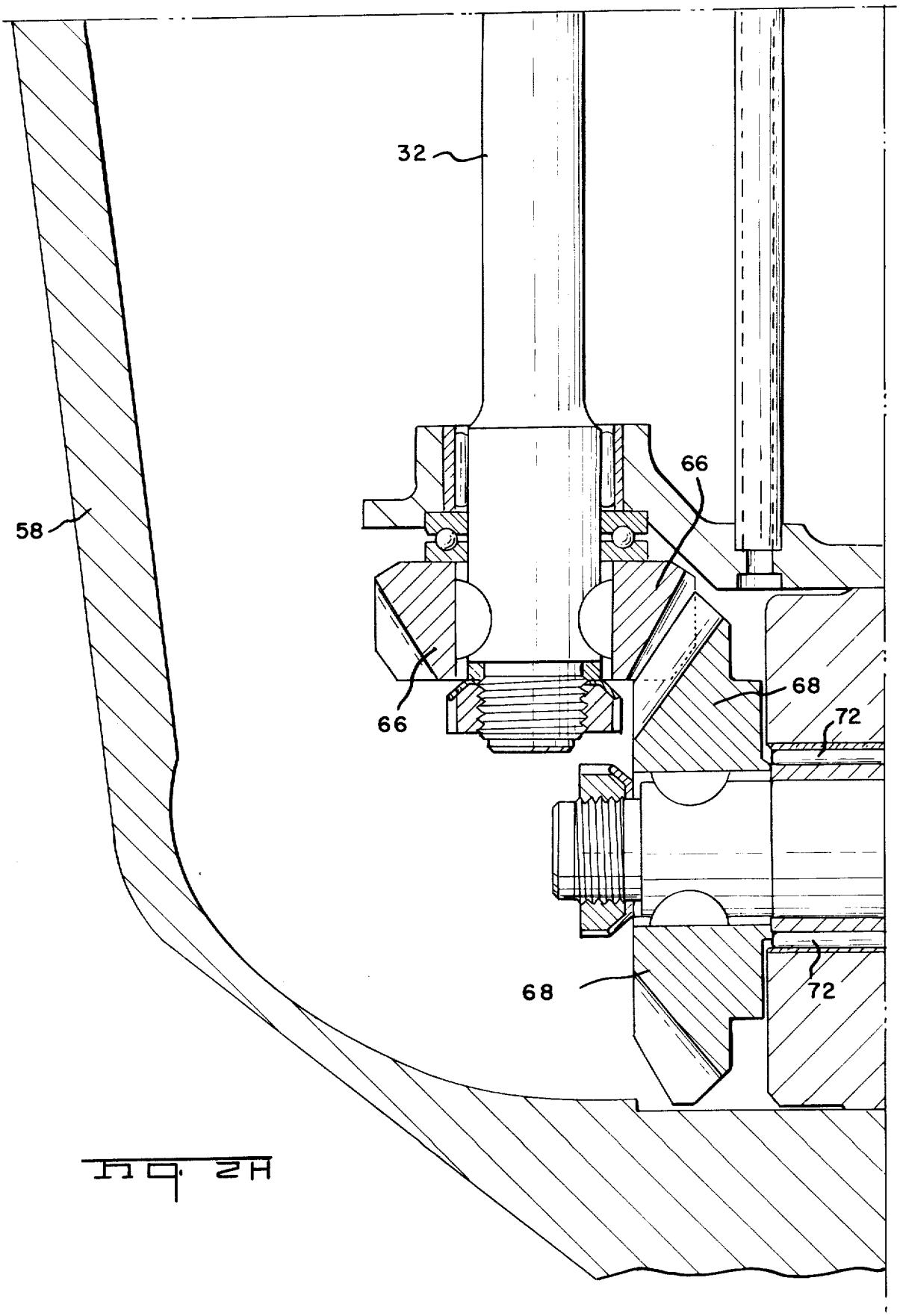
Figure 21:
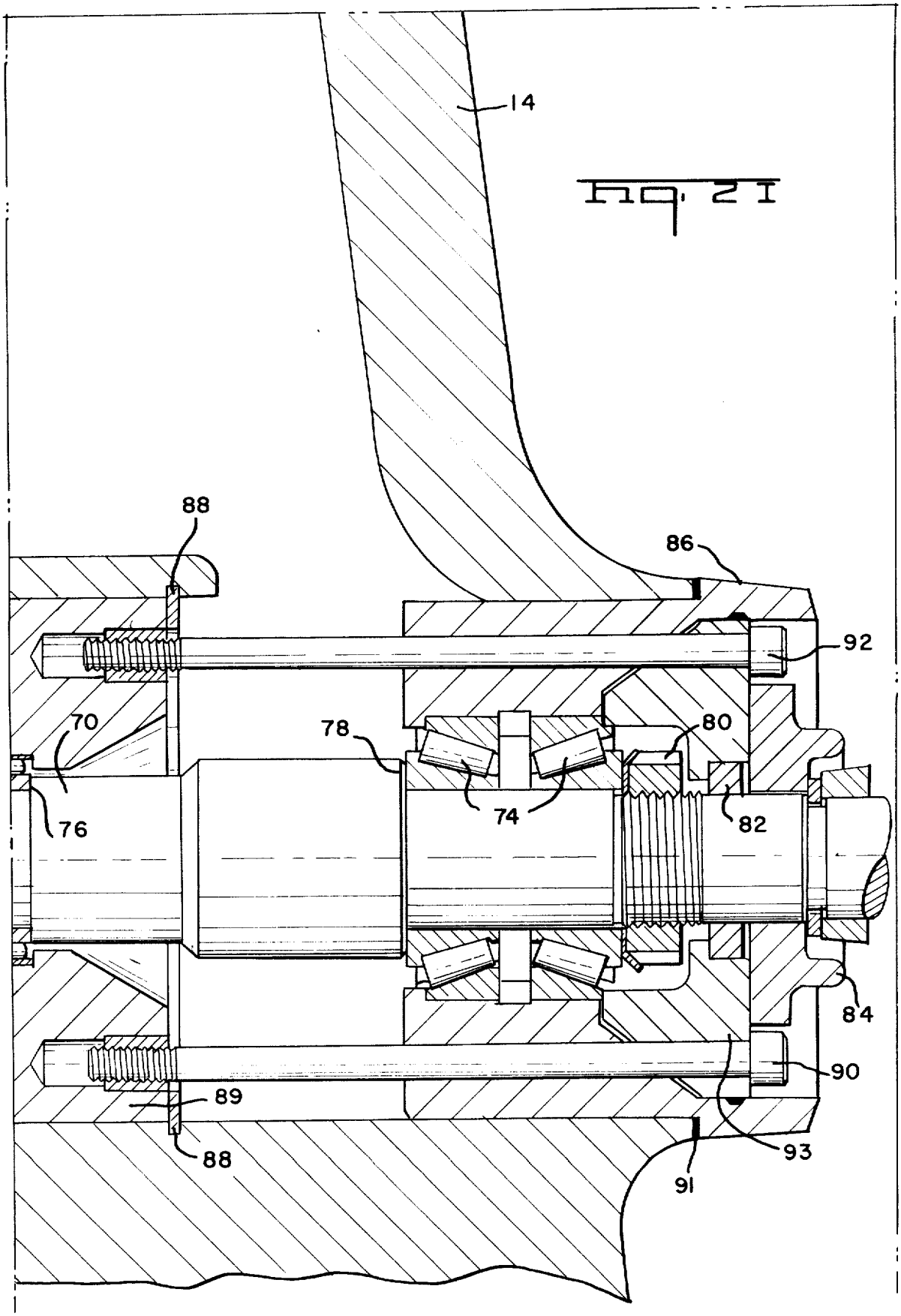
Figure 21:
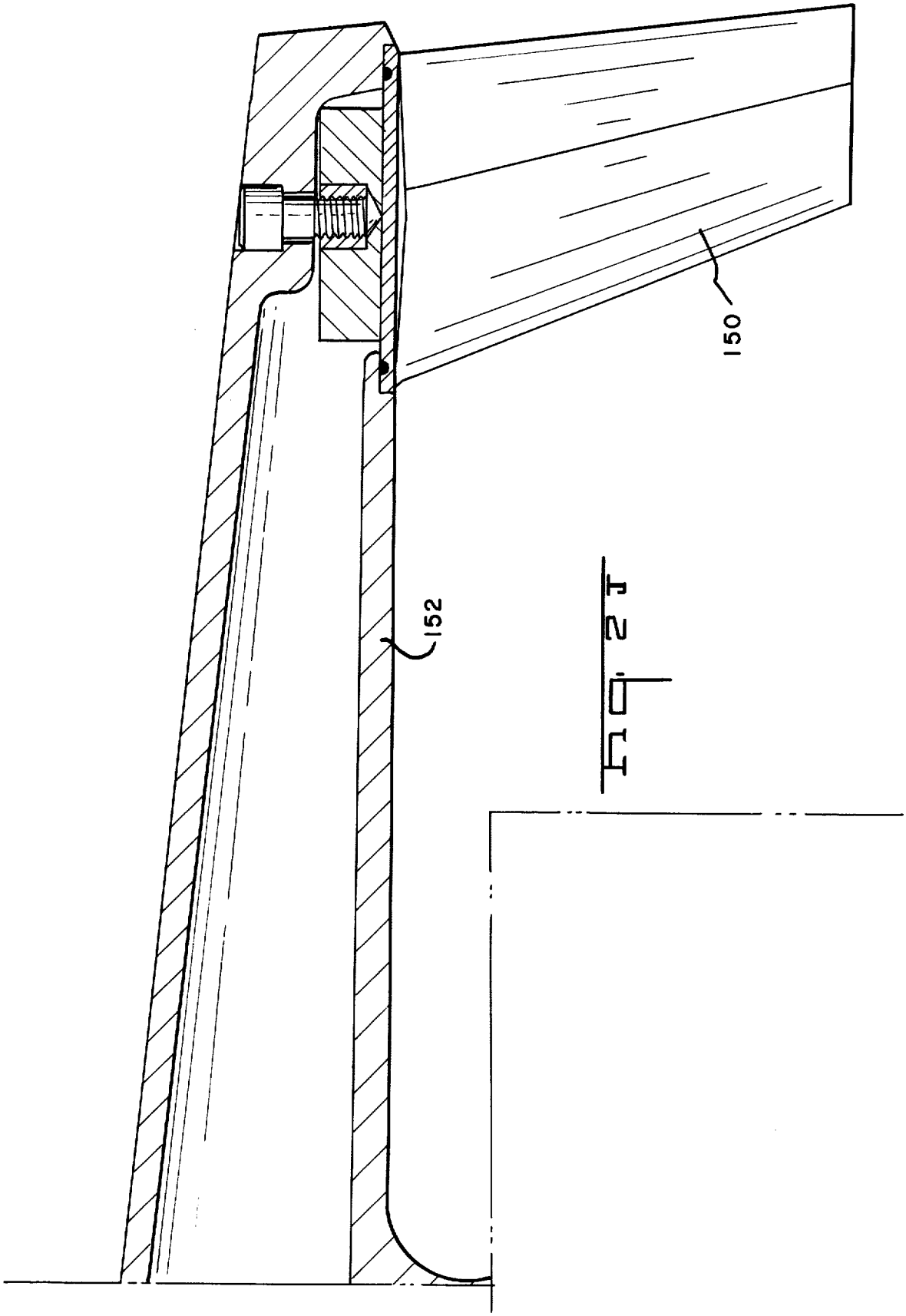
Figure 7:
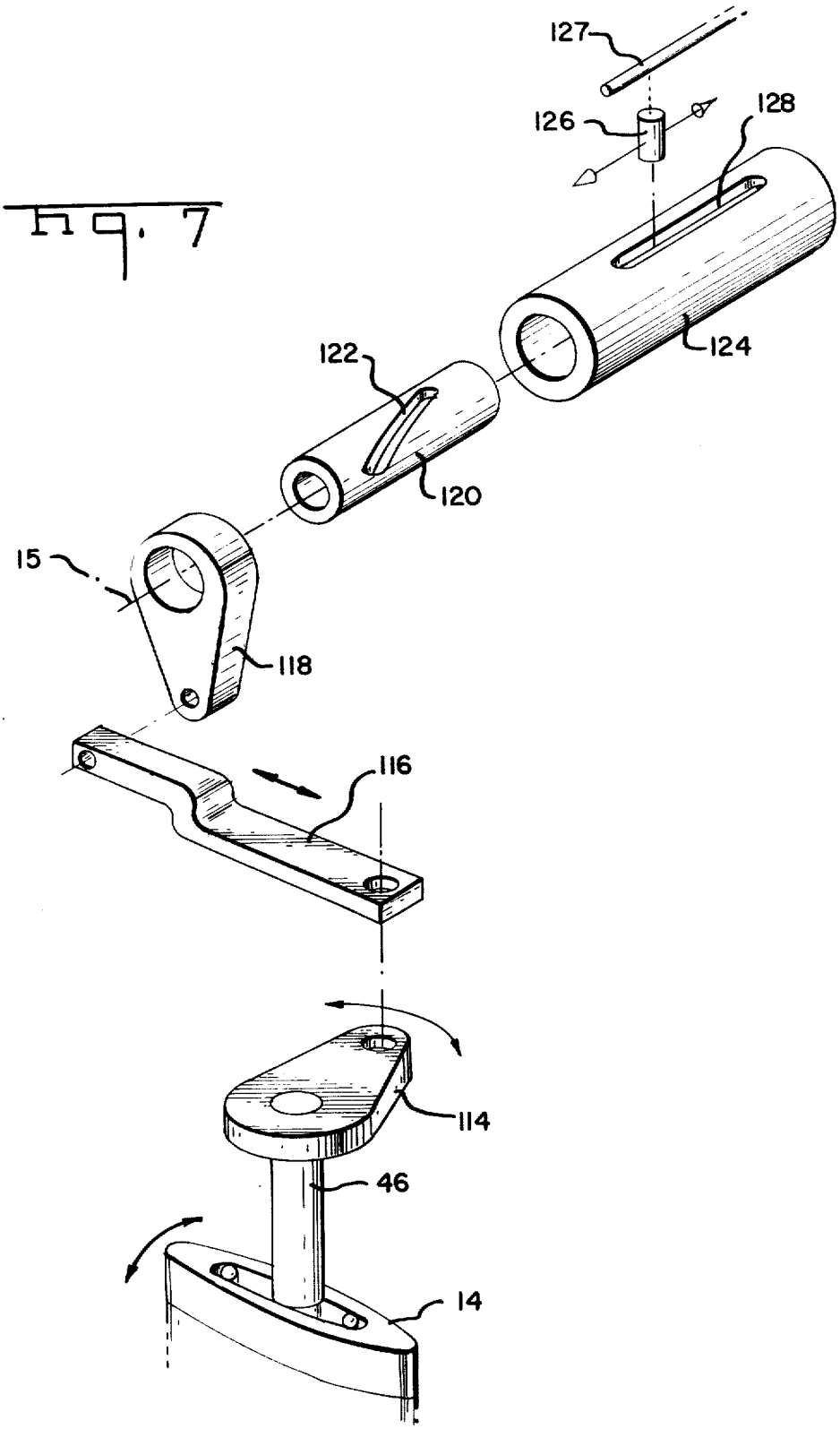

Another important aspect of this invention is the separation of the seals and the vibration absorbing mounting of the drive to the transom. Outer boot 94 prevents water from entering the drive. The gasket 98 provides the main water seal between the drive and the boat. However, the gasket 98 does not absorb vibration. The engine bell housing 101 is mounted to the transom casting 102 by the rubber covered vibration isolating mount 100. The mount 100 provides a cantilever mounting of the engine from the transom casting 102. This mount absorbs the engine vibration and prevents it from being transmitted to the drive and then to the boat. The transom casting 102 is mounted to the transom of the boat as best shown in FIG. 2F. The separation of the vibration absorbing mount from the water seal produces an increased life of the water seal.

BOAT TRIM, FIGS. 4-6

In order to trim the boat, a rubber eccentric 103 is provided. It has an outer steel sleeve 104. It is rotated on a trim input shaft 106. When the eccentric 103 is rotated it bears against the drive gear box casing 96.

An exploded view of the eccentric number is shown in FIG. 4. One important function of the eccentric is to absorb the shock when the drive forceably returns from its tilted position. Another important function of the rubber eccentric member is depicted in FIG. 5. The eccentric member deflects under load. Therefore, when the motor suddenly accelerates the boat, the drive 11 moves forward to the position shown by the dotted lines in FIG. 5. This deflects the eccentric member 103, without rotation of the shaft 106, to the position indicated by the dotted lines. This changes the angle of attack 108 of the motor. The normal prop thrust is depicted by the arrow 110 whereas the prop thrust under the starting load is depicted by the arrow 112. This deflected prop thrust has a lifting component which tends to lift the stern of the boat and bring the bow of the boat down. This aids in obtaining planing of the boat.

The operation of the eccentric member 103 in trimming the boat is depicted by FIGS. 6A and 6B. These two figures show that rotation of the eccentric member 103 about its shaft will change the angle of attack of the drive 11 to trim the boat. While the eccentric member 103 is depicted as being rubber with a steel sleeve, in many instances it will be desirable to construct it of steel with a rubber outer coating to provide resiliency.

THE STEERING LINKAGE, FIG. 7

Figure 8:
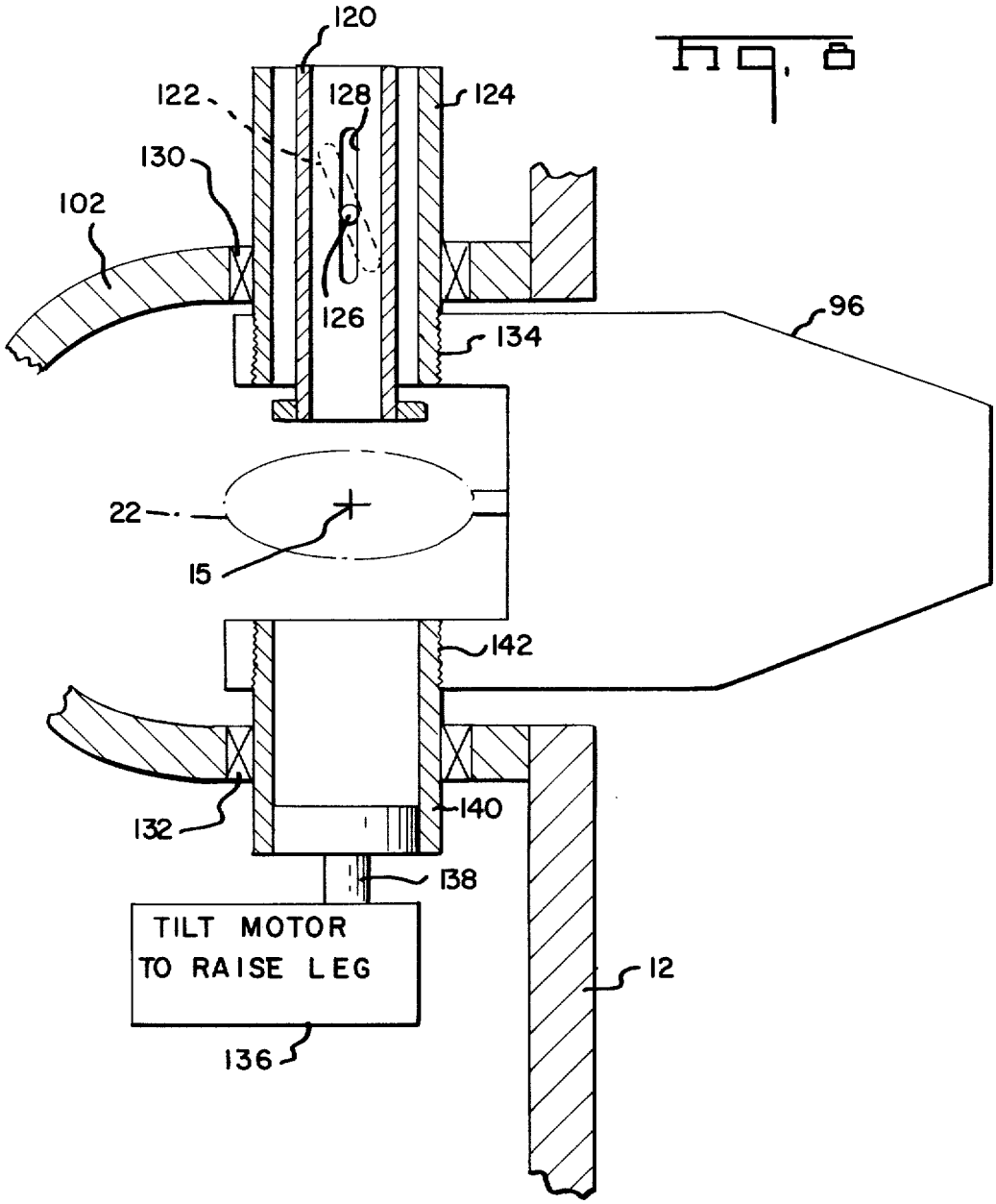
FIG. 8 is a top view of a steering mechanism and the tilt motor tube.

The steering linkage is best shown in FIG. 7. It includes a tower steering arm 114 connected to rotate the steering tube 46. A steering rod 116 is connected at one end to the arm 114 and at the other end to the bell crank 118. The bell crank 118 is rotated by the inner tube 120. The tube 120 has a curved slot 122 therein. The inner tube 120 is disposed inside of the outer tube 124 which is connected to the gear box 96 (FIG. 2). The outer tube 124 is pivoted in the transom housing 102. An interconnecting pin 126 rides in the slots 128 and 122. The interconnecting pin 126 is moved linearly by the steering cable 127. This is translated to a rotation of the inner tube 120. This rotates bell crank 118 which moves steering rod 116 linearly. This rotates tower arm 114 and steering tube 46. This produces a steering motion of the lower leg 14. A top view of the steering linkage is shown in FIG. 8. Outer tube 124 is rotatably mounted by bearings 130 in the transom casting 102. The outer tube is clamped to the gear box 96 at the point 134.

THE TILT MECHANISM, FIG. 8

A tilt motor 136 is connected through a worm drive 138 to the tilt motor shaft 140. The tilt motor shaft 140 is connected to the gear box 96 at the point 142. When the tilt motor is operated, the shaft 140 rotates thereby tilting the drive. The outer tube 124 of the steering linkage also rotates with respect to the transom casting. However, there is no movement of the interconnecting pin 126. Therefore, there is no steering motion of the lower leg. In this manner, the drive can be tilted without changing the steering mechanism. Also, as the drive is tilted, the steering mechanism does not move through a space consuming arc. The tilt motor can be either a hydraulic or an electromechanical mechanism.

THE GEAR SHIFT LINKAGE, FIGS. 9, 9A–9C

The shift bell crank 144 is rotated by the shift shaft 145 about the pivot axis 15. The end of the shift bell crank 144 is connected to the shift arm 146 which is connected to the shift fork 36 shown in FIG. 2. The shift shaft 145 is disposed within the inner tube 120 and outer tube 124. The shift shaft 145 is part of a shift linkage which is constrained to rotate with the outer tube 124 as the drive is tilted about the axis 15. This linkage includes a follower 147 which is connected at one end to rotate the shift shaft 145. The other end is disposed in the slot in the flat plate cam 149. Linear motion of the flat plate cam 149 effects a rotation of the follower 147 and causes a shifting of the transmission into either the forward or reverse positions.

Figure 9:
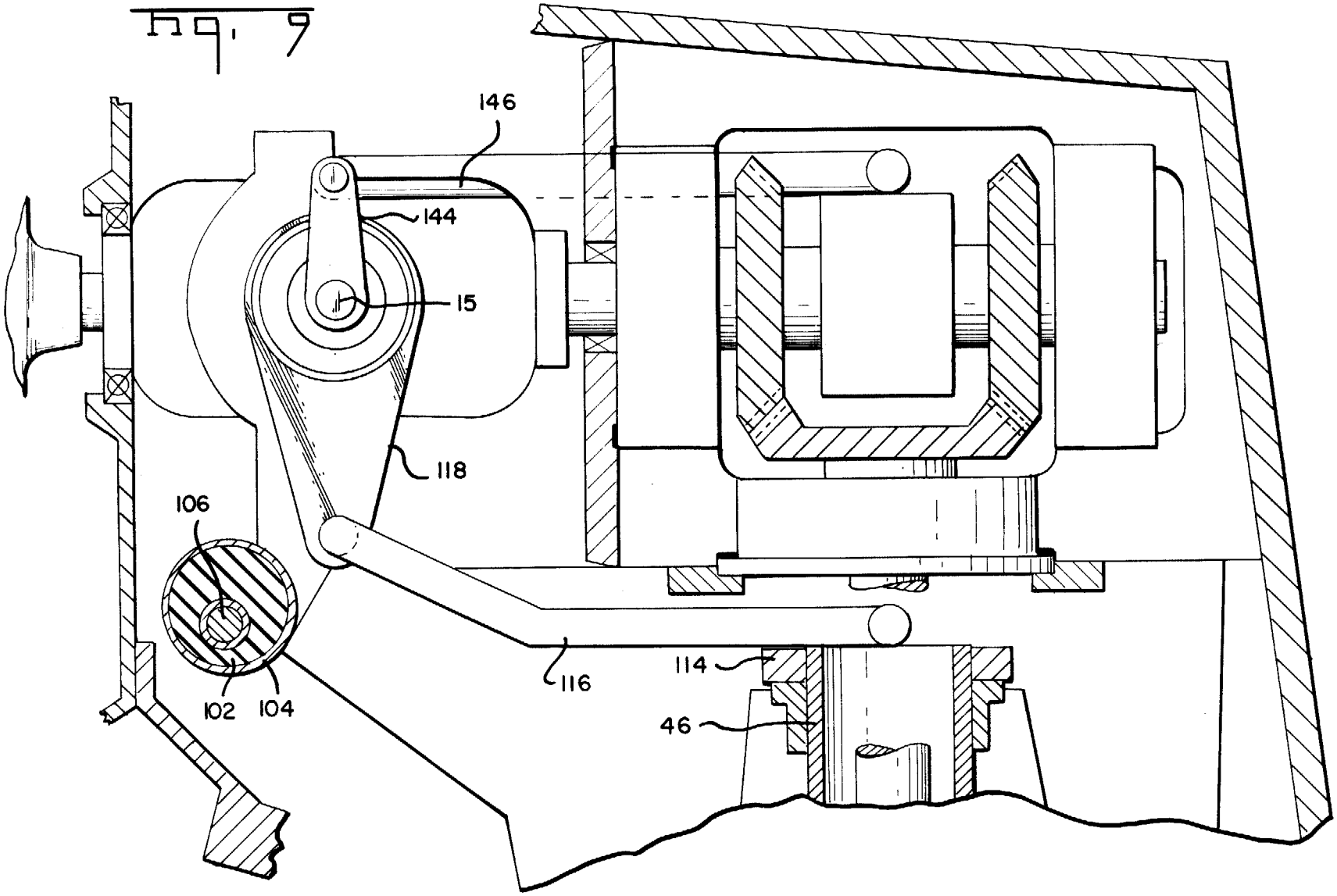
FIG. 9 is a side elevational view showing the gear shift linkage.
Figure 9A:
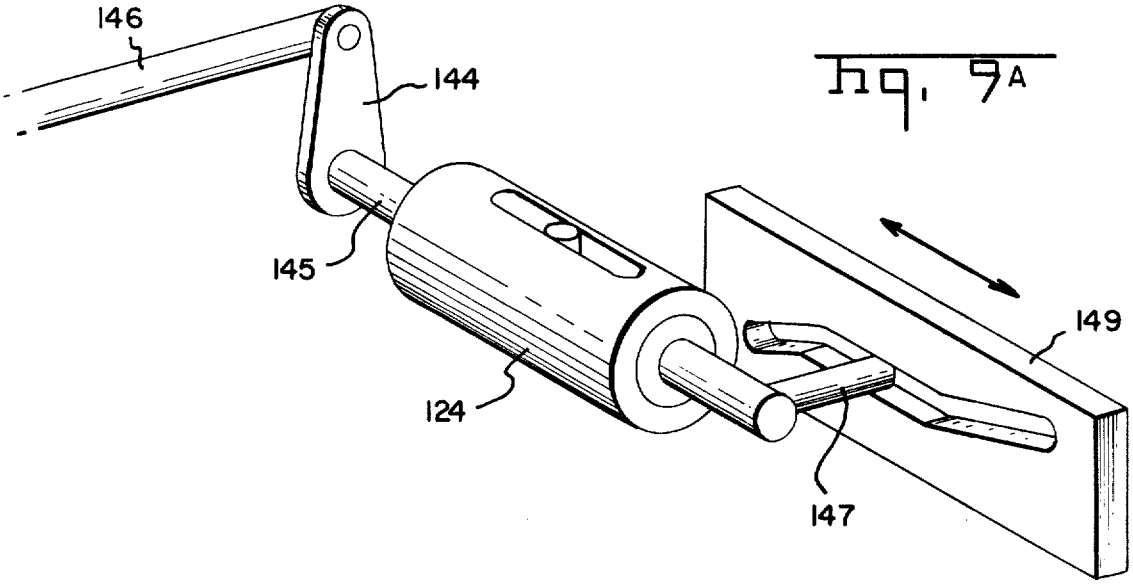
FIG. 9A is a perspective view of the shift linkage.
Figure 9B:
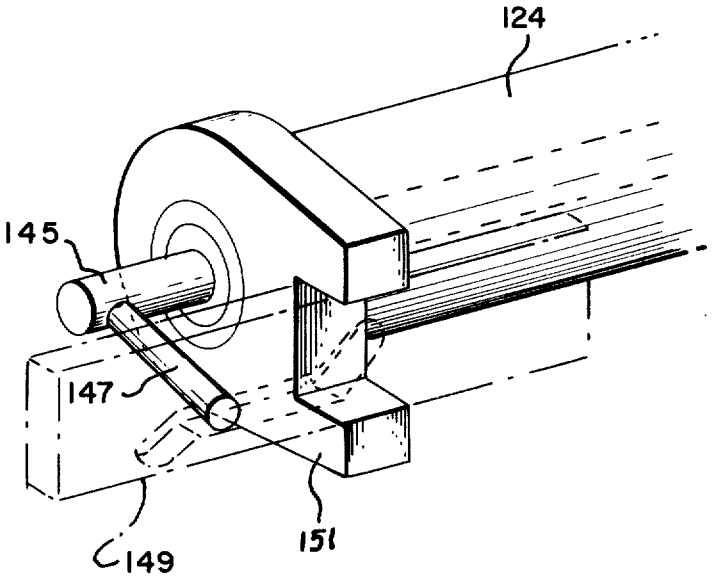
FIG. 9B is a perspective view of the other side of the shift linkage.

However, as best shown in FIG. 9B, the flat plate cam 149 is disposed in a slot in the guide 151 which is attached to and rotates with the outer tube 124. Therefore, while linear motion of the flat plate cam 149 will effect a shifting motion, tilting of the drive will not effect relative rotation between the outer tube 124 and shift shaft 145. Therefore, since there is no rotation of the shift arm 145 with respect to the gear box 96 to which outer tube 124 is affixed, there is no shift action when the drive is tilted. Stated another way, when the gear box 96 is tilted, the outer tube 124 rotates with it. There is no relative motion between the flat plate cam 149 and the follower 147 so there is no shift action. Again, tilting of the engine drive does not move the shift mechanism through a space consuming arc.

REVERSE LOCK-OUT, FIGS. 9C–9E

It is desirable to provide a lock which will prevent the drive from tilting when it is in reverse. Of course, the propeller operating in reverse would pull the drive up out of the water if it were completely free to rotate. The reverse lock-out of this invention prevents the drive from being tilted out of the water in reverse. However, it does allow some freedom of movement which tilts the drive sufficiently to slightly change the angle of attack of the propeller. Therefore, when the drive is in reverse, the angle of attack is slightly changed to a position which tends to lift the stern out of the water.

Figure 9C:
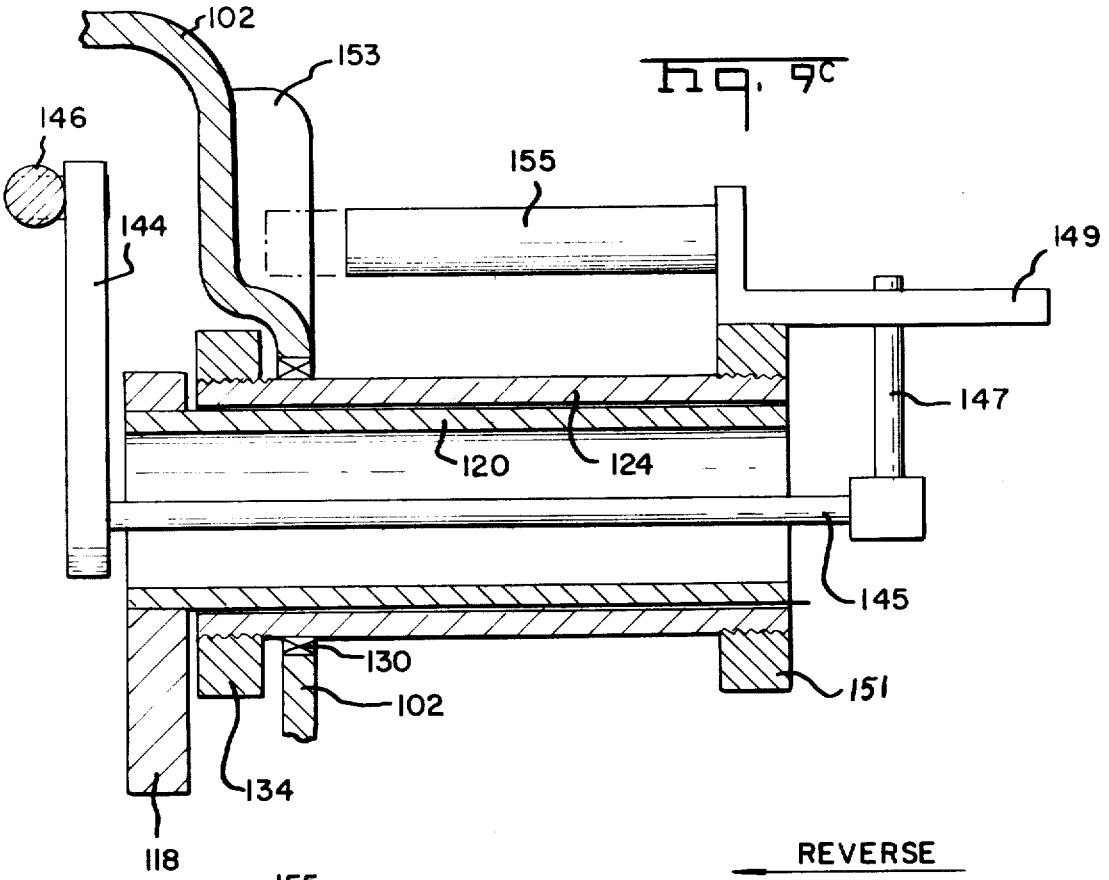
FIG. 9C is a top sectional view of the shift linkage.
Figure 9D:
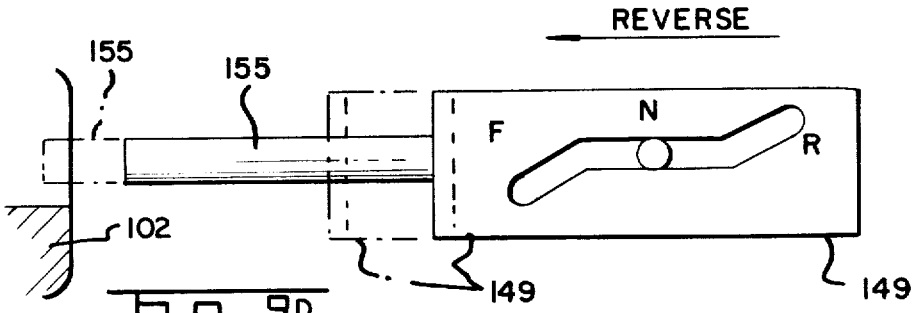
FIG. 9D shows the lock-out mechanism.
Figure 9E:
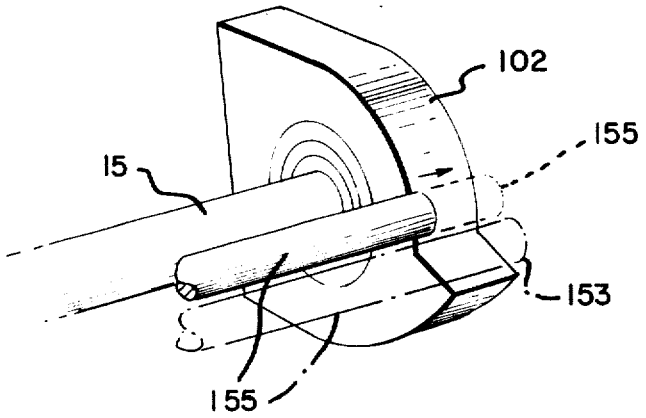
FIG. 9E is a perspective view of the engagement of the lock-out link with the shoulder on the transom casting.
Figure 10A:
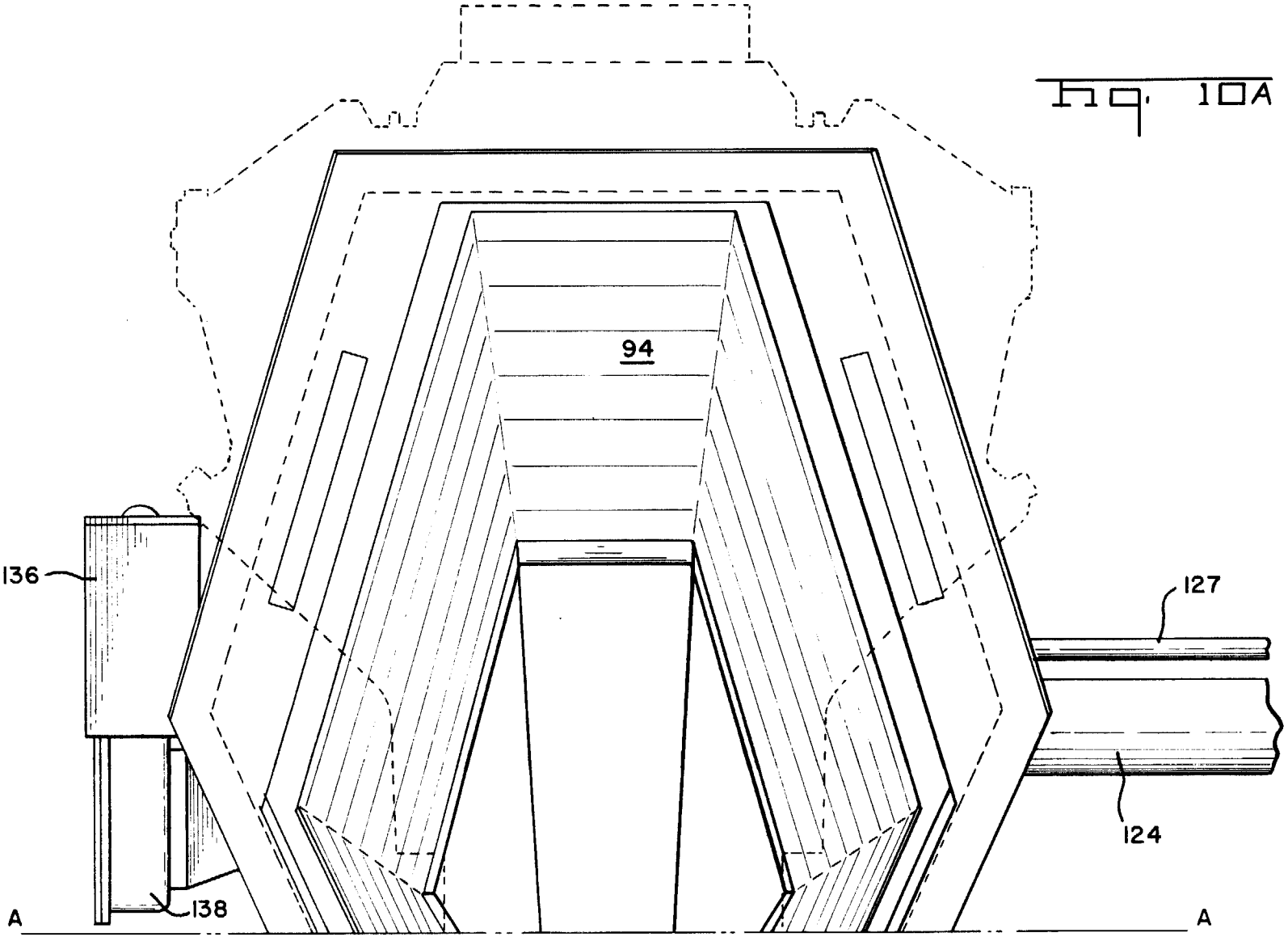
FIGS. 10A and 10B together show a rear view of the drive.
Figure 10B:
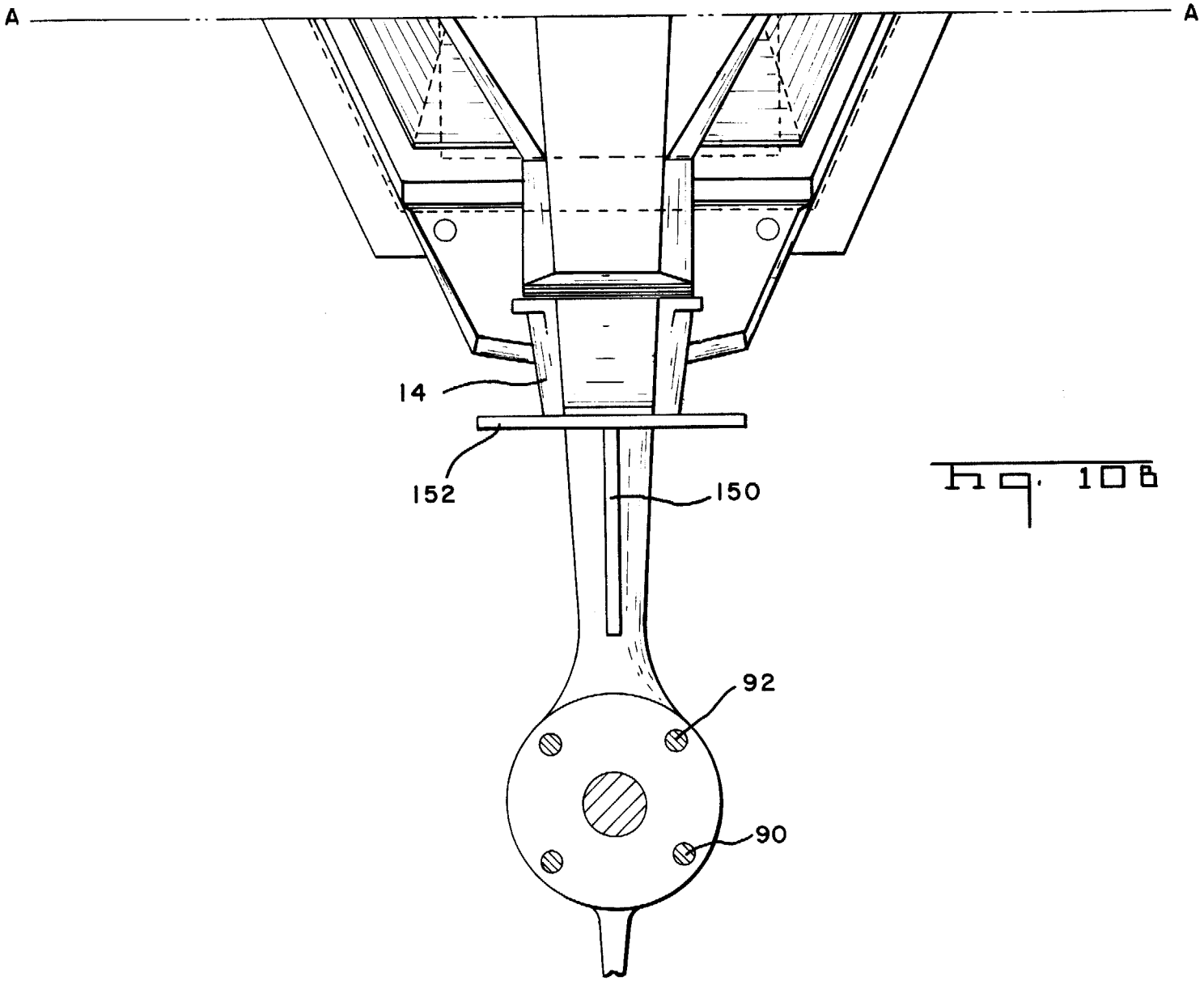

The reverse lock-out can be best seen in FIGS. 9C–9E. It includes a lock-out link 155 which is affixed to and movable with the flat plate cam 149. When the flat plate cam 149 is in the forward or neutral position the end of the lock-out link 155 clears the transom casting 102. However, when the flat plate cam 149 is in the reverse position the lock-out link 155 is engaged by a protrusion 153 on the transom casting 102.

The change in the angle of attack when the drive is in reverse can best be seen in FIG. 9E. The lock-out link 155 as shown with solid lines is in the neutral position in which it clears the shoulder 153 on the transom casting 102 to allow easy tilting of the drive about the axis 15. When the drive is shifted into reverse the lock-out link 155 assumes the dotted line position. As the propeller is driven in reverse, the drive will tend to rotate clockwise about the axis 15 until the lock-out link 155 assumes the position shown by dashed lines. At this point it is firmly engaged against the shoulder 153 on the transom casting 102 and no further tilting is possible. However, the angle of attack on the propeller has been changed slightly so that it exerts a lifting action on the stern of the boat.

What is claimed is:

1. An outboard drive for a marine engine disposed within a boat having a transom, comprising:

a rigid housing adapted to extend through an aperture in the transom and having a forward end and having a stern end adapted to be coupled to the transom, said housing having an aperture in the forward end thereof said housing further including a portion which is normally disposed below the water line of the boat, said portion being watertight;

a drive shaft extending through said aperture in the forward end of said housing for connection to the engine;

an upper unit mounted within said housing and having an input shaft, said upper unit being rotatable about a substantially horizontal axis disposed forward of the transom;

pivot means extending within said housing at either side thereof to pivotally support said upper unit along said horizontal axis;

[a flexible boot] *means for* closing the [stern end of] *space between* said rigid housing and [having an outer periphery coupled in] *said upper unit to provide a* watertight [relationship about] *closure between* said housing and [an inner periphery coupled in watertight relationship to] said upper unit;

a vertical shaft driven by said input shaft and disposed substantially transverse to the path of motion of said boat when said drive is in its normal position;

a lower steering unit having a propeller shaft which is driven by said vertical shaft, said steerable unit being rotatable about a generally vertical axis to steer said boat;

a pivot joint connecting said drive shaft to said input shaft, said pivot joint being coincident with said substantially horizontal axis so that said upper and lower units [cna] *can* be moved upwardly in an arc about said horizontal axis, and a steering linkage disposed in said upper unit to control the rotation of said lower steering unit.

2. The drive recited in claim 1 wherein said steering linkage is rotatable about *said* horizontal axis.

3. The drive recited in claim 2 further comprising:

a steering tube, said vertical shaft being disposed inside said steering tube, said steering tube being rotatably mounted in said upper unit, said lower steering unit being suspended from said steering tube so that said boat is steered by rotation of said steering tube.

4. The drive recited in claim 3 further comprising:

a tower steering arm on said steering tube, said steering linkage being connected to said arm for rotating said steering tube.

5. The drive recited in claim 4 wherein said steering linkage includes:

an inner tube rotatable about said horizontal axis, rotation of said inner tube with respect to said upper unit effecting a steering rotation of said lower unit, an outer tube [siad] *said* inner tube being disposed within said outer tube, said outer tube having a slot along the longitudinal axis thereof, said inner tube having a curved slot, an interconnecting pin disposed in both of said slots so that linear motion of said pin is translated to rotational motion of said inner tube which effects a steering motion of said lower unit, and said outer tube being connected to said upper unit and pivoted with respect to said boat transom about said horizontal axis so that said drive is rotatable about said horizontal axis without changing the steering position of said lower unit.

6. The drive recited in claim 5 wherein said steering linkage further includes:

a steering arm connected to said inner tube, and a steering rod interconnecting said last named steering arm and said tower steering arm.

7. The drive recited in claim 1 further comprising:

an eccentric member bearing against said upper unit so that when it is rotated said upper unit rotates about said horizontal axis to change the angle of said propeller shaft for trimming said boat.

8. The drive recited in claim 7 wherein said eccentric member is constructed of resilient material which will deflect under load.

9. The drive recited in claim 1 further comprising:

a transmission, a shift rod rotatable about said horizontal axis, and a shift arm connected to said transmission and connected to said shift rod for shifting said transmission in response to rotation of said shift rod about said horizontal axis.

10. The drive recited in claim 1 further comprising:

a tilt mechanism, a tube rotated by a tilt motor around the tube axis which passes through said horizontal axis, said tube being connected to said upper unit to rotate said drive out of its normal position about said horizontal axis.

11. The drive recited in claim 1 in combination with an engine having a housing, and:

a watertight seal between said engine housing and the transom housing, and a separate vibration absorbing mount connecting said engine to said transom housing.

12. The drive recited in claim 1 further comprising:

a cowl fitting over said propeller shaft, a snap ring secured in said lower unit, an inner bearing cartridge having bearings in which said propeller shaft are journaled and threaded bolt openings, said snap ring being between said inner bearing cartridge and said cowl so that said snap ring is a shoulder against which said cartridge bears, said lower unit having a shoulder against which said cowl bears, and bolts extending through said cowl into said threaded openings to secure said cowl and cartridge as an assembly within said lower unit.

13. An outboard drive for a marine engine disposed within a boat, having a transom, comprising:

a rigid housing adapted to extend through an aperture in the transom and having a forward end and having a stern end adapted to be coupled to the transom, said housing having an aperture in the forward end thereof said housing further including a portion which is normally disposed below the water line of the boat, said portion being watertight;

a drive shaft extending through said aperture and adapted to be connected to said engine;

an input shaft disposed generally parallel to the path of motion of said boat when said drive is in its normal position;

a vertical shaft connected to said input shaft and disposed substantially transverse to said path when said drive is in its normal position;

an upper unit disposed within said housing and mounted thereto by pivot means by which said upper unit may be rotated about a substantially horizontal axis disposed forward of said transom, said upper unit enclosing a transmission connected between said input shaft and said vertical shaft;

[a flexible boot] *means for* closing the [stern end of] *space between* said rigid housing and [having an outer periphery coupled in] *said upper unit to provide a* watertight [relationship about] *closure between* said housing and [an inner periphery coupled in watertight relationship to] said upper unit;

a propeller shaft connected to said vertical shaft;

a pivot joint between said drive shaft and said input shaft, said pivot point being disposed in said drive at a pivot point which is inside said boat when said drive is mounted on said boat, said drive being rotatable out of its normal position about said pivot point.

14. A propeller driving assembly for an outboard marine drive of the type comprising:

a lower leg, a propeller shaft within said lower leg, a cowl fitting over said propeller shaft, a snap ring secured in said lower leg, an inner bearing cartridge having bearings in which said propeller shaft is journaled, and threaded bolt openings, said snap ring being between said inner bearing cartridge and said cowl so that said snap ring is a shoulder against which said cartridge bears, said lower leg having a shoulder against which said cowl bears, and bolts extending through said cowl into said threaded openings to secure said cowl and said cartridge as an assembly within said lower leg.

* * * * *